United States Patent
Ponnuru et al.

(10) Patent No.: US 12,547,784 B2
(45) Date of Patent: Feb. 10, 2026

(54) SYSTEMS AND METHODS TO REPRESENT FUNCTIONS IN A PCIe MULTI-FUNCTION FIELD REPLACEABLE UNIT

(71) Applicant: Dell Products, L.P., Round Rock, TX (US)

(72) Inventors: Viswanath Ponnuru, Bangalore (IN); Austin P. Bolen, Austin, TX (US); Chandrashekar Nelogal, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 261 days.

(21) Appl. No.: 18/178,593

(22) Filed: Mar. 6, 2023

(65) Prior Publication Data
US 2024/0303380 A1 Sep. 12, 2024

(51) Int. Cl.
*G06F 21/00* (2013.01)
*G06F 21/33* (2013.01)
*G06F 21/85* (2013.01)

(52) U.S. Cl.
CPC .............. *G06F 21/85* (2013.01); *G06F 21/33* (2013.01)

(58) Field of Classification Search
CPC ........... G06F 21/85; G06F 21/33; G06F 21/44
See application file for complete search history.

(56) References Cited

U.S. PATENT DOCUMENTS

| | | | | |
|---|---|---|---|---|
| 12,414,172 B2* | 9/2025 | Gupta | ......................... | G06F 9/54 |
| 2003/0065940 A1* | 4/2003 | Brezak | .................. | H04L 63/083 |
| | | | | 726/4 |
| 2003/0204631 A1* | 10/2003 | Pinkerton | ............. | H04L 69/161 |
| | | | | 709/249 |
| 2003/0204634 A1* | 10/2003 | Pinkerton | ............. | H04L 69/161 |
| | | | | 709/250 |
| 2005/0086509 A1* | 4/2005 | Ranganathan | .......... | G06F 21/57 |
| | | | | 726/27 |
| 2006/0104308 A1* | 5/2006 | Pinkerton | ............. | H04L 69/321 |
| | | | | 370/469 |
| 2018/0132264 A1* | 5/2018 | Jung | ...................... | H04W 72/20 |
| 2021/0144517 A1* | 5/2021 | Guim Bernat | ........ | G06F 9/5072 |
| 2021/0314365 A1* | 10/2021 | Smith | .................... | G06F 11/301 |
| 2022/0078863 A1* | 3/2022 | Gupta | ....................... | G06F 9/54 |
| 2022/0171648 A1* | 6/2022 | Rodriguez | .......... | G06F 9/45533 |
| 2022/0327084 A1* | 10/2022 | Das Sharma | ....... | G06F 13/4295 |

(Continued)

*Primary Examiner* — Mahfuzur Rahman
(74) *Attorney, Agent, or Firm* — Fogarty LLP

(57) ABSTRACT

Embodiments of systems and methods to determine all of the Functions that are associated with a multi-Function Peripheral Component Interconnect/Compute Express Link (PCIe/CXL) Field Replaceable Unit (FRU) for use in SPDM authentication of a PCIe/CXL FRU are disclosed. According to one embodiment, a multi-Function PCIe/CXL FRU includes multiple Functions that each are represented by a unique Device/Function path. A PCIe/CXL FRU includes computer-executable program instructions that cause it to receive a request from a Security Protocol and Data Model (SPDM) requester to obtain information about a plurality of Functions associated with the PCIe/CXL FRU, and respond to the request by sending a list of Device/Function paths to the SPDM requester. Each Device/Function path indicates the Function and the path to the Function associated with the PCIe/CXL FRU.

20 Claims, 8 Drawing Sheets

(56) References Cited

U.S. PATENT DOCUMENTS

| | | | | |
|---|---|---|---|---|
| 2022/0329584 A1* | 10/2022 | Sharma | ................. | H04L 9/3263 |
| 2024/0143547 A1* | 5/2024 | Autor | .................... | G06F 16/134 |
| 2024/0154883 A1* | 5/2024 | Li | ....................... | H04L 47/2483 |
| 2024/0184929 A1* | 6/2024 | Orlando | .................. | G06F 21/57 |

* cited by examiner

SYSTEMS AND METHODS TO REPRESENT FUNCTIONS IN A PCIe MULTI-FUNCTION FIELD REPLACEABLE UNIT

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Modern day IHS administrative management is often provided via Remote Access Controllers (RACs). The RAC generally includes a specialized microcontroller embedded in the IHS, and may provide an interface between system-management software and platform hardware. Different types of sensors built into the IHS report to the RAC on parameters such as temperature, cooling fan speeds, power status, operating system (O/S) status, and the like. The RAC monitors the sensors and can send alerts to a system administrator via the network if any of the parameters do not stay within pre-set limits, indicating a potential failure of the system. The administrator can also remotely communicate with the RAC to take certain corrective actions, such as resetting or power cycling the system to get a hung O/S running again. These abilities can often save on the total cost of ownership of an IHS, particularly when implemented in large clusters, such as server farms.

SUMMARY

Embodiments of systems and methods to determine all of the Functions that are associated with a multi-Function Peripheral Component Interconnect/Compute Express Link (PCIe/CXL) Field Replaceable Unit (FRU) for use in SPDM authentication of a PCIe/CXL FRU are disclosed. According to one embodiment, a multi-Function PCIe/CXL FRU includes multiple Functions that each are represented by a unique Device/Function path. The PCIe/CXL FRU includes computer-executable program instructions that cause it to receive a request from a Security Protocol and Data Model (SPDM) requester to obtain information about a plurality of Functions associated with the PCIe/CXL FRU, and respond to the request by sending a list of Device/Function paths to the SPDM requester. Each Device/Function path indicates the Function and the path to the Function associated with the PCIe/CXL FRU.

According to another embodiment, a multi-Function PCIe/CXL FRU representation method includes the steps of receiving, by a PCIe/CXL FRU, a request from a Security Protocol and Data Model (SPDM) requester to obtain information about a plurality of Functions that each are represented by a unique Device/Function path, and responding to the request by sending a list of Device/Function paths to the SPDM requester, wherein each Device/Function path indicates the Function and the path to the Function associated with the PCIe/CXL FRU.

According to yet another embodiment, an Information Handling System (IHS) includes a PCIe/CXL FRU. The multi-Function PCIe/CXL FRU includes multiple Functions that each are represented by a unique Device/Function path. The PCIe/CXL FRU includes computer-executable program instructions that cause it to receive a request from a Security Protocol and Data Model (SPDM) requester to obtain information about a plurality of Functions associated with the PCIe/CXL FRU, and respond to the request by sending a list of Device/Function paths to the SPDM requester. Each Device/Function path indicates the Function and the path to the Function associated with the PCIe/CXL FRU.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1A:
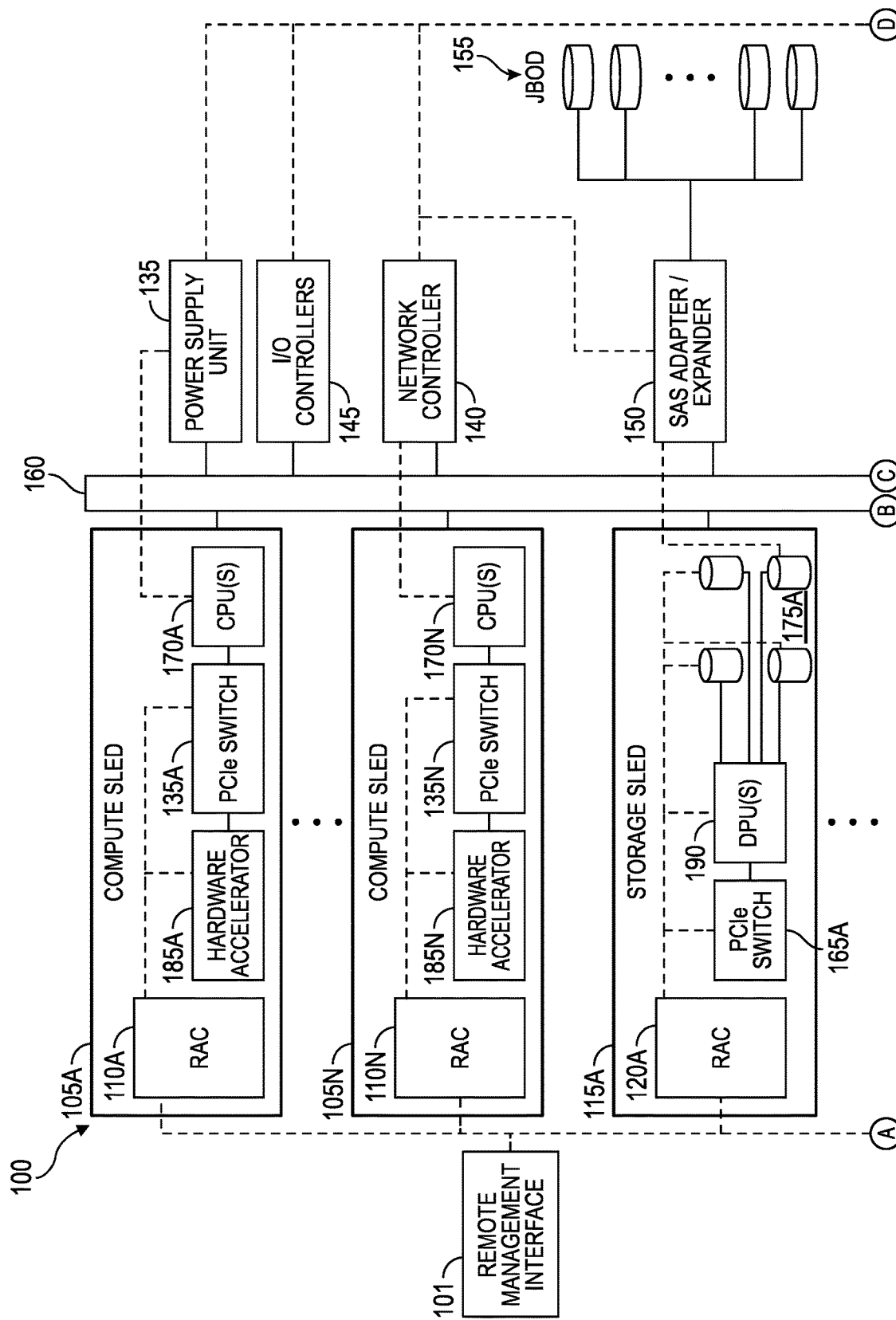
FIGS. 1A and 1B are block diagrams illustrating certain components of a chassis comprising one or more compute sleds and one or more storage sleds that may be configured to implement the systems and methods described according to one embodiment of the present disclosure.

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

Certain IHSs may be configured with RACs that are used to monitor, and in some cases manage computer hardware components of their respective IHSs. A RAC is normally programmed using a firmware stack that configures the RAC for performing out-of-band (e.g., external to a computer's operating system or BIOS) hardware management tasks. The RAC firmware can support industry-standard specifications, such as the Intelligent Platform Management Interface (IPMI) and Systems Management Architecture of Server Hardware (SMASH) for computer system administration.

Various standards have been proposed to more effectively interconnect and operate PCIe devices. These include the specialization of communication standards distributed by groups such as the Institute of Electrical and Electronics Engineers (IEEE), and those that specify security requirements and approaches for IoT and distributed device settings are also being proposed by the Trusted Computing Group (TCG). The Distributed Management Task Force (DMTF), for example, defines a standard to allow cryptographic authentication of devices in a computer system that may be referred to as a Security Protocol and Data Model (SPDM). These security contexts are enabled through the use of various hardware components with security approaches enabled by a Trusted Computing Group (TCG) Device Identifier Composition Engine (DICE) implementation.

If a device is composed of a single entity (e.g., layer), then authenticating the device using SPDM is straightforward. Devices, however, may be composed of multiple individual devices that may exist at different layers. For example, PCIe or Compute Express Link (CXL) FRUs may be composed of multiple devices and Functions. The Devices/Functions may be a part of the same field-replaceable unit (FRU). For example, a dual-ported NVMe drive may appear as two independent PCIe Devices/Functions but are typically part of a single ASIC. A single certificate in SPDM is sufficient to authenticate both PCIe Devices/Functions.

The Devices/Functions may also be composed of multiple individual FRUs. For example, a PCIe adapter may be composed of four individual M.2 NVMe SSD FRUs. In this example, each individual M.2 module would need its own certificate in order to be authenticated using SPDM. As will be described in detail herein below, embodiments of the present disclosure provide techniques to represent SPDM-DICE evidence for PCIe multi-Function devices.

Figure 1B:
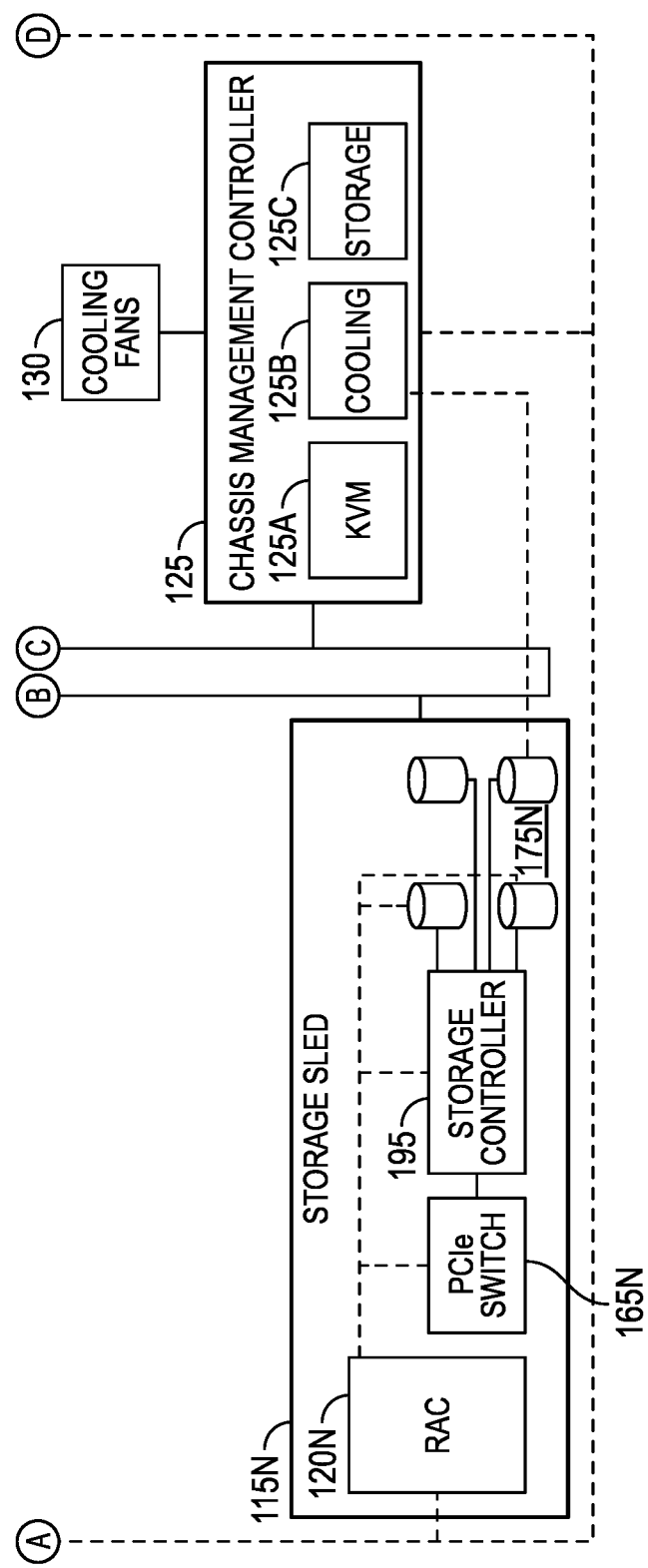

FIGS. 1A and 1B are block diagrams illustrating certain components of a chassis 100 comprising one or more compute sleds 105a-n and one or more storage sleds 115a-n that may be configured to implement the systems and methods described according to one embodiment of the present disclosure. Embodiments of chassis 100 may include a wide variety of hardware configurations in which one or more sleds 105a-n, 115a-n are installed in chassis 100. Such variations in hardware configuration may result from chassis 100 being factory assembled to include components specified by a customer that has contracted for manufacture and delivery of chassis 100. Upon delivery and deployment of a chassis 100, the chassis 100 may be modified by replacing and/or adding various hardware components, in addition to replacement of the removable sleds 105a-n, 115a-n that are installed in the chassis. In addition, once the chassis 100 has been deployed, firmware used by individual hardware components of the sleds 105a-n, 115a-n, or by other hardware components of chassis 100, may be modified in order to update the operations that are supported by these hardware components.

Chassis 100 may include one or more bays that each receive an individual sled (that may be additionally or alternatively referred to as a tray, blade, and/or node), such as compute sleds 105a-n and storage sleds 115a-n. Chassis 100 may support a variety of different numbers (e.g., 4, 8, 16, 32), sizes (e.g., single-width, double-width) and physical configurations of bays. Embodiments may include additional types of sleds that provide various storage, power and/or processing capabilities. For instance, sleds installable in chassis 100 may be dedicated to providing power management or networking functions. Sleds may be individually installed and removed from the chassis 100, thus allowing the computing and storage capabilities of a chassis to be reconfigured by swapping the sleds with diverse types of sleds, in some cases at runtime without disrupting the ongoing operations of the other sleds installed in the chassis 100.

Multiple chassis 100 may be housed within a rack. Data centers may utilize large numbers of racks, with various different types of chassis installed in various configurations of racks. The modular architecture provided by the sleds, chassis and racks allow for certain resources, such as cooling, power and network bandwidth, to be shared by the compute sleds 105a-n and storage sleds 115a-n, thus providing efficiency improvements and supporting greater computational loads. For instance, certain computational tasks, such as computations used in machine learning and other artificial intelligence systems, may utilize computational and/or storage resources that are shared within an IHS, within an individual chassis 100 and/or within a set of IHSs that may be spread across multiple chassis of a data center.

Implementing computing systems that span multiple processing components of chassis 100 is aided by high-speed data links between these processing components, such as PCIe connections that form one or more distinct PCIe switch fabrics that are implemented by PCIe switches 135a-n, 165a-n installed in the sleds 105a-n, 115a-n of the chassis. These high-speed data links may be used to support algorithm implementations that span multiple processing, networking, and storage components of an IHS and/or chassis 100. For instance, computational tasks may be delegated to a specific processing component of an IHS, such as to a hardware accelerator 185a-n that may include one or more programmable processors that operate separate from the main CPUs 170a-n of computing sleds 105a-n. In various embodiments, such hardware accelerators 185a-n may include DPUs (Data Processing Units), GPUs (Graphics Processing Units), SmartNICs (Smart Network Interface Card) and/or FPGAs (Field Programmable Gate Arrays). These hardware accelerators 185a-n operate according to firmware instructions that may be occasionally updated, such as to adapt the capabilities of the respective hardware accelerators 185a-n to specific computing tasks.

Chassis 100 may be installed within a rack structure that provides at least a portion of the cooling utilized by the sleds 105a-n, 115a-n installed in chassis 100. In supporting airflow cooling, a rack may include one or more banks of cooling fans 130 that may be operated to ventilate heated air from within the chassis 100 that is housed within the rack. The chassis 100 may alternatively or additionally include one or more cooling fans 130 that may be similarly operated to ventilate heated air away from sleds 105a-n, 115a-n installed within the chassis. In this manner, a rack and a chassis 100 installed within the rack may utilize various configurations and combinations of cooling fans 130 to cool the sleds 105a-n, 115a-n and other components housed within chassis 100.

The sleds 105a-n, 115a-n may be individually coupled to chassis 100 via connectors that correspond to the bays provided by the chassis 100 and that physically and electrically couple an individual sled to a backplane 160. Chassis backplane 160 may be a printed circuit board that includes electrical traces and connectors that are configured to route signals between the various components of chassis 100 that are connected to the backplane 160 and between different components mounted on the printed circuit board of the backplane 160. In the illustrated embodiment, the connectors for use in coupling sleds 105a-n, 115a-n to backplane 160 include PCIe couplings that support high-speed data links with the sleds 105a-n, 115a-n. In various embodiments, backplane 160 may support diverse types of connections, such as cables, wires, midplanes, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, I/O controllers 145, network controller 140, chassis management controller 125 and power supply unit 135.

Figure 2:
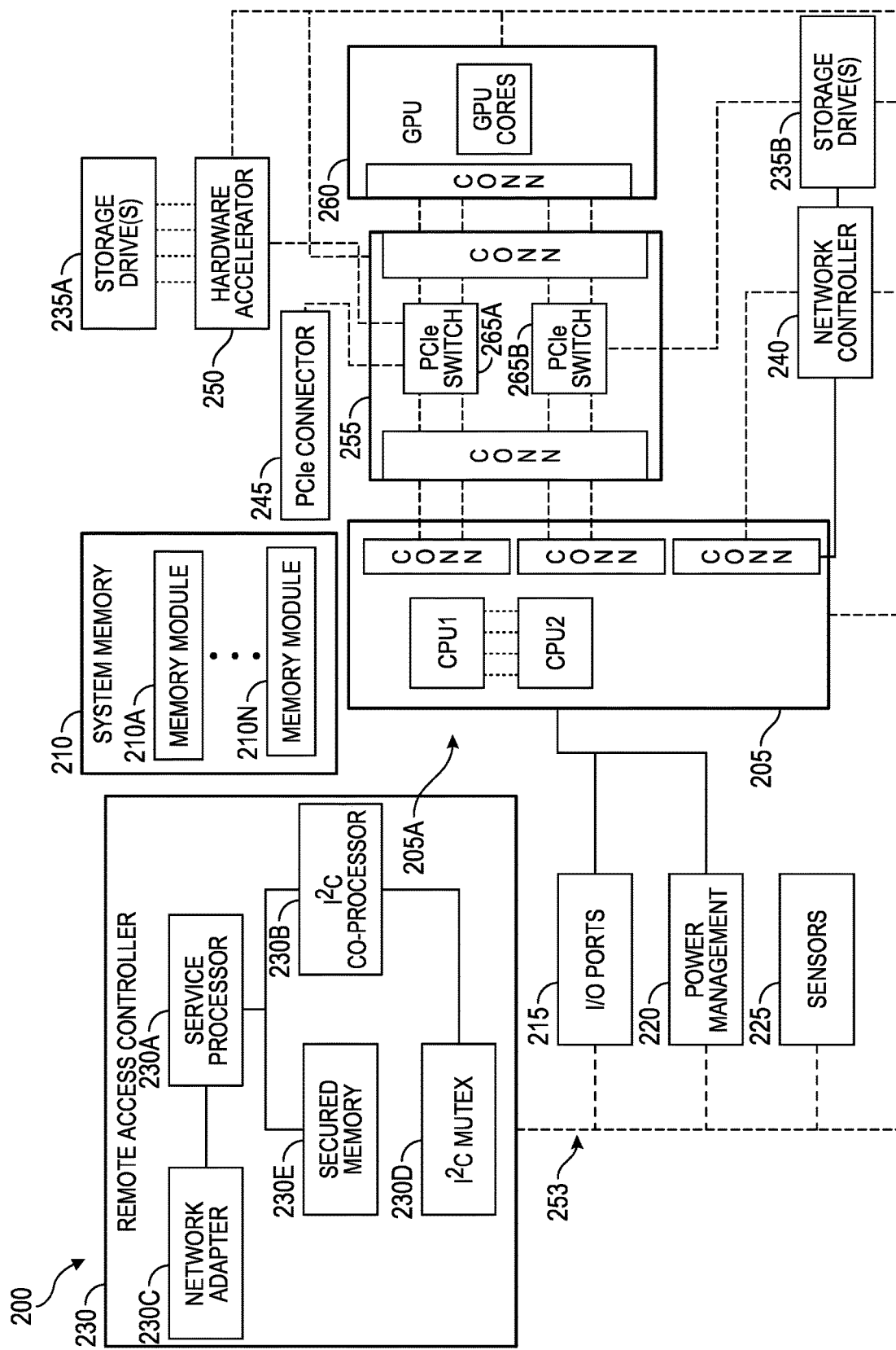
FIG. 2 illustrates an example of an IHS configured to implement systems and methods described herein according to one embodiment of the present disclosure.

In certain embodiments, each individual sled 105a-n, 115a-n may be an IHS such as described with regard to IHS 200 of FIG. 2. Sleds 105a-n, 115a-n may individually or collectively provide computational processing resources that may be used to support a variety of e-commerce, multimedia, business, and scientific computing applications, such as artificial intelligence systems provided via cloud computing implementations. Sleds 105a-n, 115a-n are typically configured with hardware and software that provide leading-edge computational capabilities. Accordingly, services that are provided using such computing capabilities are typically provided as high-availability systems that operate with minimum downtime.

In high-availability computing systems, such as may be implemented using embodiments of chassis 100, any downtime that can be avoided is preferred. As described above, firmware updates are expected in the administration and operation of data centers, but it is preferable to avoid any downtime in making such firmware updates. For instance, in updating the firmware of the individual hardware components of the chassis 100, it is preferable that such updates can be made without having to reboot the chassis. As described in additional detail below, it is also preferable that updates to the firmware of individual hardware components of sleds 105a-n, 115a-n be likewise made without having to reboot the respective sled of the hardware component that is being updated.

As illustrated, each sled 105a-n, 115a-n includes a respective remote access controller (RAC) 110a-n, 120a-n. As described in additional detail with regard to FIG. 2, remote access controller 110a-n, 120a-n provides capabilities for remote monitoring and management of a respective sled 105a-n, 115a-n and/or of chassis 100. In support of these monitoring and management functions, remote access controllers 110a-n may utilize both in-band and sideband (i.e., out-of-band) communications with various managed components of a respective sled 105a-n and chassis 100. Remote access controllers 110a-n, 120a-n may collect diverse types of sensor data, such as collecting temperature sensor readings that are used in support of airflow cooling of the chassis 100 and the sled 105a-n, 115a-n. In addition, each remote access controller 110a-n, 120a-n may implement various monitoring and administrative functions related to a respective sled 105a-n, 115a-n, where these functions may be implemented using sideband bus connections with various internal components of the chassis 100 and of the respective sleds 105a-n, 115a-n. As described in additional detail below, in various embodiments, these capabilities of the remote access controllers 110a-n, 120a-n may be utilized in updating the firmware of hardware components of chassis 100 and/or of hardware components of the sleds 105a-n, 115a-n, without having to reboot the chassis or any of the sleds 105a-n, 115a-n.

The remote access controllers 110a-n, 120a-n that are present in chassis 100 may support secure connections with a remote management interface 101. In some embodiments, remote management interface 101 provides a remote administrator with various capabilities for remotely administering the operation of an IHS, including initiating updates to the firmware used by hardware components installed in the chassis 100. For example, remote management interface 101 may provide capabilities by which an administrator can initiate updates to all of the storage drives 175a-n installed in a chassis 100, or to all of the storage drives 175a-n of a particular model or manufacturer. In some instances, remote management interface 101 may include an inventory of the hardware, software, and firmware of chassis 100 that is being remotely managed through the operation of the remote access controllers 110a-n, 120a-n. The remote management interface 101 may also include various monitoring interfaces for evaluating telemetry data collected by the remote access controllers 110a-n, 120a-n. In some embodiments, remote management interface 101 may communicate with remote access controllers 110a-n, 120a-n via a protocol such the Redfish remote management interface.

In the illustrated embodiment, chassis 100 includes one or more compute sleds 105a-n that are coupled to the backplane 160 and installed within one or more bays or slots of chassis 100. Each of the individual compute sleds 105a-n may be an IHS, such as described with regard to FIG. 2. Each of the individual compute sleds 105a-n may include various different numbers and types of processors that may be adapted to performing specific computing tasks. In the illustrated embodiment, each of the compute sleds 105a-n includes a PCIe switch 135a-n that provides access to a hardware accelerator 185a-n, such as the described DPUs, GPUs, Smart NICs and FPGAs, which may be programmed and adapted for specific computing tasks, such as to support machine learning or other artificial intelligence systems. As described in additional detail below, compute sleds 105a-n may include a variety of hardware components, such as hardware accelerator 185a-n and PCIe switches 135a-n, that operate using firmware that may be occasionally updated.

As illustrated, a storage sled 115a may include one or more DPUs (Data Processing Units) 190 that provide access to and manage the operations of the storage drives 175a of the storage sled 115a. Use of a DPU 190 in this manner provides low-latency and high-bandwidth access to numerous SSDs 175a. These SSDs 175a may be utilized in parallel through NVMe transmissions that are supported by the PCIe switch 165a that connects the SSDs 175a to the DPU 190. In some instances, PCIe switch 165a may be an integrated component of a DPU 190. The immense data storage and retrieval capabilities provided by such storage sled 115a implementations may be harnessed by offloading storage operations directed as storage drives 175a to a DPU 190a, and thus without relying on the main CPU of the storage sled, or of any other component of chassis 100. As indicated in FIG. 1, chassis 100 may also include one or more storage sleds 115*n* that provide access to storage drives 175*n* via a storage controller 195. In some embodiments, storage controller 195 may provide support for RAID (Redundant Array of Independent Disks) configurations of logical and physical storage drives, such as storage drives provided by storage sled 115*n*. In some embodiments, storage controller 195 may be a HBA (Host Bus Adapter) that provides more limited capabilities in accessing storage drives 175*n*.

In addition to the data storage capabilities provided by storage sleds 115*a*-*n*, chassis 100 may provide access to other storage resources that may be installed components of chassis 100 and/or may be installed elsewhere within a rack that houses the chassis 100. In certain scenarios, such storage resources (e.g., JBOD 155) may be accessed via a SAS expander 150 that is coupled to the backplane 160 of the chassis 100. The SAS expander 150 may support connections to a number of JBOD (Just a Bunch of Disks) storage resources 155 that, in some instances, may be configured and managed individually and without implementing data redundancy across the various drives. The additional JBOD storage resources 155 may also be at various other locations within a datacenter in which chassis 100 is installed.

In light of the various manners in which storage drives 175*a*-*n*, 155 may be coupled to chassis 100, a wide variety of different storage topologies may be supported. Through these supported topologies, storage drives 175*a*-*n*, 155 may be logically organized into clusters or other groupings that may be collectively tasked and managed. In some instances, a chassis 100 may include numerous storage drives 175*a*-*n*, 155 that are identical, or nearly identical, such as arrays of SSDs of the same manufacturer and model. Accordingly, any firmware updates to storage drives 175*a*-*n*, 155 require the updates to be applied within each of these topologies being supported by the chassis 100. Despite the large number of different storage drive topologies that may be supported by an individual chassis 100, the firmware used by each of these storage devices 175*a*-*n*, 155 may be occasionally updated. In some instances, firmware updates may be limited to a single storage drive, but in other instances, firmware updates may be initiated for a large number of storage drives, such as for all SSDs installed in chassis 100.

As illustrated, the chassis 100 of FIG. 1 includes a network controller 140 that provides network access to the sleds 105*a*-*n*, 115*a*-*n* installed within the chassis. Network controller 140 may include various switches, adapters, controllers, and couplings used to connect chassis 100 to a network, either directly or via additional networking components and connections provided via a rack in which chassis 100 is installed. Network controller 140 operates according to firmware instructions that may be occasionally updated.

Chassis 100 may similarly include a power supply unit 135 that provides the components of the chassis with various levels of DC power from an AC power source or from power delivered via a power system provided by a rack within which chassis 100 may be installed. In certain embodiments, power supply unit 135 may be implemented within a sled that may provide chassis 100 with redundant, hot-swappable power supply units. Power supply unit 135 may operate according to firmware instructions that may be occasionally updated.

Chassis 100 may also include various I/O controllers 145 that may support various I/O ports, such as USB ports that may be used to support keyboard and mouse inputs and/or video display capabilities. Each of the I/O controllers 145 may operate according to firmware instructions that may be occasionally updated. Such I/O controllers 145 may be utilized by the chassis management controller 125 to support various KVM (Keyboard, Video and Mouse) 125*a* capabilities that provide administrators with the ability to interface with the chassis 100. The chassis management controller 125 may also include a storage module 125*c* that provides capabilities for managing and configuring certain aspects of the storage devices of chassis 100, such as the storage devices provided within storage sleds 115*a*-*n* and within the JBOD 155.

In addition to providing support for KVM 125*a* capabilities for administering chassis 100, chassis management controller 125 may support various additional functions for sharing the infrastructure resources of chassis 100. In some scenarios, chassis management controller 125 may implement tools for managing the power supply unit 135, network controller 140 and airflow cooling fans 130 that are available via the chassis 100. As described, the airflow cooling fans 130 utilized by chassis 100 may include an airflow cooling system that is provided by a rack in which the chassis 100 may be installed and managed by a cooling module 125*b* of the chassis management controller 125.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 illustrates an example of an IHS 200 configured to implement systems and methods described herein according to one embodiment of the present disclosure. It should be appreciated that although the embodiments described herein may describe an IHS that is a compute sled or similar computing component that may be deployed within the bays of a chassis, a variety of other types of IHSs, such as laptops and portable devices, may also operate according to embodiments described herein. In the illustrative embodiment of FIG. 2, IHS 200 may be a computing component, such as sled 105*a*-*n*, 115*a*-*n* or other type of server, such as a 1RU server installed within a 2RU chassis, which is configured to share infrastructure resources provided within a chassis 100.

IHS 200 may utilize one or more system processors 205, that may be referred to as CPUs (central processing units). In some embodiments, CPUs 205 may each include a plurality of processing cores that may be separately delegated with computing tasks. Each of the CPUs 205 may be individually designated as a main processor and as a co-processor, where such designations may be based on delegation of specific types of computational tasks to a CPU 205. In some embodiments, CPUs 205 may each include an integrated memory controller that may be implemented directly within the circuitry of each CPU 205. In some embodiments, a memory controller may be a separate integrated circuit that is located on the same die as the CPU 205. Each memory controller may be configured to manage the transfer of data to and from a system memory 210 of the IHS, in some cases using a high-speed memory bus 205a. The system memory 210 is coupled to CPUs 205 via one or more memory buses 205a that provide the CPUs 205 with high-speed memory used in the execution of computer program instructions by the CPUs 205. Accordingly, system memory 210 may include memory components, such as static RAM (SRAM), dynamic RAM (DRAM), NAND Flash memory, suitable for supporting high-speed memory operations by the CPUs 205. In certain embodiments, system memory 210 may combine persistent non-volatile memory and volatile memory.

In certain embodiments, the system memory 210 may be comprised of multiple removable memory modules. The system memory 210 of the illustrated embodiment includes removable memory modules 210a-n. Each of the removable memory modules 210a-n may correspond to a printed circuit board memory socket that receives a removable memory module 210a-n, such as a DIMM (Dual In-line Memory Module), that can be coupled to the socket and then decoupled from the socket as needed, such as to upgrade memory capabilities or to replace faulty memory modules. Other embodiments of IHS system memory 210 may be configured with memory socket interfaces that correspond to diverse types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 200 may utilize a chipset that may be implemented by integrated circuits that are connected to each CPU 205. All or portions of the chipset may be implemented directly within the integrated circuitry of an individual CPU 205. The chipset may provide the CPU 205 with access to a variety of resources accessible via one or more in-band buses. IHS 200 may also include one or more I/O ports 215 that may be used to couple the IHS 200 directly to other IHSs, storage resources, diagnostic tools, and/or other peripheral components. A variety of additional components may be coupled to CPUs 205 via a variety of in-line buses. For instance, CPUs 205 may also be coupled to a power management unit 220 that may interface with a power system of the chassis 100 in which IHS 200 may be installed. In addition, CPUs 205 may collect information from one or more sensors 225 via a management bus.

In certain embodiments, IHS 200 may operate using a BIOS (Basic Input/Output System) that may be stored in a non-volatile memory accessible by the CPUs 205. The BIOS may provide an abstraction layer by which the operating system of the IHS 200 interfaces with hardware components of the IHS. Upon powering or restarting IHS 200, CPUs 205 may utilize BIOS instructions to initialize and test hardware components coupled to the IHS, including both components permanently installed as components of the motherboard of IHS 200, and removable components installed within various expansion slots supported by the IHS 200. The BIOS instructions may also load an operating system for execution by CPUs 205. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 230.

In some embodiments, IHS 200 may include a TPM (Trusted Platform Module) that may include various registers, such as platform configuration registers, and a secure storage, such as an NVRAM (Non-Volatile Random-Access Memory). The TPM may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of IHS, such as the BIOS and boot loader of IHS 200. These calculated hash values may then be compared against reference hash values that were previously stored in a secure non-volatile memory of the IHS, such as during factory provisioning of IHS 200. In this manner, a TPM may establish a root of trust that includes core components of IHS 200 that are validated as operating using instructions that originate from a trusted source.

As illustrated, CPUs 205 may be coupled to a network controller 240, such as provided by a Network Interface Controller (NIC) card that provides IHS 200 with communications via one or more external networks, such as the Internet, a LAN, or a WAN. In some embodiments, network controller 240 may be a replaceable expansion card or adapter that is coupled to a connector (e.g., PCIe connector of a motherboard, backplane, midplane, etc.) of IHS 200. In some embodiments, network controller 240 may support high-bandwidth network operations by the IHS 200 through a PCIe interface that is supported by the chipset of CPUs 205. Network controller 240 may operate according to firmware instructions that may be occasionally updated.

As indicated in FIG. 2, in some embodiments, CPUs 205 may be coupled to a PCIe card 255 that includes two PCIe switches 265a-b that operate as I/O controllers for PCIe communications, such as TLPs (Transaction Layer Packets), that are transmitted between the CPUs 205 and PCIe devices and systems coupled to IHS 200. Whereas the illustrated embodiment of FIG. 2 includes two CPUs 205 and two PCIe switches 265a-b, different embodiments may operate using different numbers of CPUs and PCIe switches. In addition to serving as I/O controllers that route PCIe traffic, PCIe switches 265a-b include switching logic that can be used to expand the number of PCIe connections that are supported by CPUs 205. PCIe switches 265a-b may multiply the number of PCIe lanes available to CPUs 205, thus allowing more PCIe devices to be connected to CPUs 205, and for the available PCIe bandwidth to be allocated with greater granularity. Each of the PCIe switches 265a-b may operate according to firmware instructions that may be occasionally updated.

Using the available PCIe lanes, the PCIe switches 265a-b may be used to implement a PCIe switch fabric. Also through this switch fabric, PCIe NVMe (Non-Volatile Memory Express) transmission may be supported and utilized in high-speed communications with SSDs, such as storage drives 235a-b, of the IHS 200. Also through this switch fabric, PCIe VDM (Vendor Defined Messaging) may be supported and utilized in managing PCIe-compliant hardware components of the IHS 200, such as in updating the firmware utilized by the hardware components.

As indicated in FIG. 2, IHS 200 may support storage drives 235a-b in various topologies, in the same manner as described with regard to the chassis 100 of FIG. 1. In the illustrated embodiment, storage drives 235a are accessed via a hardware accelerator 250, while storage drives 235b are accessed directly via PCIe switch 265b. In some embodiments, the storage drives 235a-b of IHS 200 may include a combination of both SSD and magnetic disk storage drives. In other embodiments, all of the storage drives 235a-b of IHS 200 may be identical, or nearly identical. In all embodiments, storage drives 235a-b operate according to firmware instructions that may be occasionally updated.

As illustrated, PCIe switch 265a is coupled via a PCIe link to a hardware accelerator 250, such as a DPU, Smart-NIC, GPU and/or FPGA, that may be a connected to the IHS via a removable card or baseboard that couples to a PCIe connector of the IHS 200. In some embodiments, hardware accelerator 250 includes a programmable processor that can be configured for offloading functions from CPUs 205. In some embodiments, hardware accelerator 250 may include a plurality of programmable processing cores and/or hardware accelerators, which may be used to implement functions used to support devices coupled to the IHS 200. In some embodiments, the processing cores of hardware accelerator 250 include ARM (advanced RISC (reduced instruction set computing) machine) processing cores. In other embodiments, the cores of the DPUs may include MIPS (microprocessor without interlocked pipeline stages) cores, RISC-V cores, or CISC (complex instruction set computing) (i.e., x86) cores. Hardware accelerator may operate according to firmware instructions that may be occasionally updated.

In the illustrated embodiment, the programmable capabilities of hardware accelerator 250 implement functions used to support storage drives 235a, such as SSDs. In such storage drive topologies, hardware accelerator 250 may implement processing of PCIe NVMe communications with SSDs 235a, thus supporting high-bandwidth connections with these SSDs. Hardware accelerator 250 may also include one more memory devices used to store program instructions executed by the processing cores and/or used to support the operation of SSDs 235a such as in implementing cache memories and buffers utilized in support of high-speed operation of these storage drives, and in some cases may be used to provide high-availability and high-throughput implementations of the read, write and other I/O operations that are supported by these storage drives 235a. In other embodiments, hardware accelerator 250 may implement operations in support of other types of devices and may similarly support high-bandwidth PCIe connections with these devices. For instance, in various embodiments, hardware accelerator 250 may support high-bandwidth connections, such as PCIe connections, with networking devices in implementing functions of a network switch, compression and codec functions, virtualization operations or cryptographic functions.

As illustrated in FIG. 2, PCIe switches 265a-b may also support PCIe couplings with one or more GPUs (Graphics Processing Units) 260. Embodiments may include one or more GPU cards, where each GPU card is coupled to one or more of the PCIe switches 265a-b, and where each GPU card may include one or more GPUs 260. In some embodiments, PCIe switches 265a-b may transfer instructions and data for generating video images by the GPUs 260 to and from CPUs 205. Accordingly, GPUs 260 may include one or more hardware-accelerated processing cores that are optimized for performing streaming calculation of vector data, matrix data and/or other graphics data, thus supporting the rendering of graphics for display on devices coupled either directly or indirectly to IHS 200. In some instances, GPUs may be utilized as programmable computing resources for offloading other functions from CPUs 205, in the same manner as hardware accelerator 250. GPUs 260 may operate according to firmware instructions that may be occasionally updated.

As illustrated in FIG. 2, PCIe switches 265a-b may support PCIe connections in addition to those utilized by GPUs 260 and hardware accelerator 250, where these connections may include PCIe links of one or more lanes. For instance, PCIe connectors 245 supported by a printed circuit board of IHS 200 may allow various other systems and devices to be coupled to IHS. Through couplings to PCIe connectors 245, a variety of data storage devices, graphics processors and network interface cards may be coupled to IHS 200, thus supporting a wide variety of topologies of devices that may be coupled to the IHS 200.

As described, IHS 200 includes a remote access controller 230 that supports remote management of IHS 200 and of various internal components of IHS 200. In certain embodiments, remote access controller 230 may operate from a different power plane from the CPUs 205 and other components of IHS 200, thus allowing the remote access controller 230 to operate, and manage tasks to proceed, while the processing cores of IHS 200 are powered off. Various functions provided by the BIOS, including launching the operating system of the IHS 200, and/or functions of a TPM may be implemented or supplemented by the remote access controller 230. In some embodiments, the remote access controller 230 may perform various functions to verify the integrity of the IHS 200 and its hardware components prior to initialization of the operating system of IHS 200 (i.e., in a bare-metal state). In some embodiments, certain operations of the remote access controller 230, such as the operations described herein for updating firmware used by managed hardware components of IHS 200, may operate using validated instructions, and thus within the root of trust of IHS 200.

In some embodiments, remote access controller 230 may include a service processor 230a, or specialized microcontroller, which operates management software that supports remote monitoring and administration of IHS 200. The management operations supported by remote access controller 230 may be remotely initiated, updated, and monitored via a remote management interface 101, such as described with regard to FIG. 1. Remote access controller 230 may be installed on the motherboard of IHS 200 or may be coupled to IHS 200 via an expansion slot or other connector provided by the motherboard. In some instances, the management functions of the remote access controller 230 may utilize information collected by various managed sensors 225 located within the IHS. For instance, temperature data collected by sensors 225 may be utilized by the remote access controller 230 in support of closed-loop airflow cooling of the IHS 200. As indicated, remote access controller 230 may include a secured memory 230e for exclusive use by the remote access controller in support of management operations.

In some embodiments, remote access controller 230 may implement monitoring and management operations using MCTP (Management Component Transport Protocol) messages that may be communicated to managed devices 205, 235a-b, 240, 250, 255, 260 via management connections supported by a sideband bus 253. In some embodiments, the remote access controller 230 may additionally or alternatively use MCTP messaging to transmit Vendor Defined Messages (VDMs) via the in-line PCIe switch fabric supported by PCIe switches 265a-b. In some instances, the sideband management connections supported by remote access controller 230 may include PLDM (Platform Level Data Model) management communications with the managed devices 205, 235a-b, 240, 250, 255, 260 of IHS 200.

As illustrated, remote access controller 230 may include a network adapter 230c that provides the remote access controller with network access that is separate from the network controller 240 utilized by other hardware components of the IHS 200. Through secure connections supported by network adapter 230c, remote access controller 230 communicates management information with remote management interface 101. In support of remote monitoring functions, network adapter 230c may support connections between remote access controller 230 and external management tools using wired and/or wireless network connections that operate using a variety of network technologies. As a non-limiting example of a remote access controller, the integrated Dell Remote Access Controller (iDRAC) from Dell® is embedded within Dell servers and provides functionality that helps information technology (IT) administrators deploy, update, monitor, and maintain servers remotely.

Remote access controller 230 supports monitoring and administration of the managed devices of an IHS via a sideband bus 253. For instance, messages utilized in device and/or system management may be transmitted using I2C sideband bus 253 connections that may be individually established with each of the respective managed devices 205, 235a-b, 240, 250, 255, 260 of the IHS 200 through the operation of an I2C multiplexer 230d of the remote access controller. As illustrated in FIG. 2, the managed devices 205, 235a-b, 240, 250, 255, 260 of IHS 200 are coupled to the CPUs 205, either directly or directly, via in-line buses that are separate from the I2C sideband bus 253 connections used by the remote access controller 230 for device management.

In certain embodiments, the service processor 230a of remote access controller 230 may rely on an I2C co-processor 230b to implement sideband I2C communications between the remote access controller 230 and the managed hardware components 205, 235a-b, 240, 250, 255, 260 of the IHS 200. The I2C co-processor 230b may be a specialized co-processor or micro-controller that is configured to implement a I2C bus interface used to support communications with managed hardware components 205, 235a-b, 240, 250, 255, 260 of IHS. In some embodiments, the I2C co-processor 230b may be an integrated circuit on the same die as the service processor 230a, such as a peripheral system-on-chip feature that may be provided by the service processor 230a. The I2C sideband bus 253 is illustrated as single line in FIG. 2. However, sideband bus 253 may be comprised of multiple signaling pathways, where each may be comprised of a clock line and data line that couple the remote access controller 230 to I2C endpoints 205, 235a-b, 240, 250, 255, 260.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3:
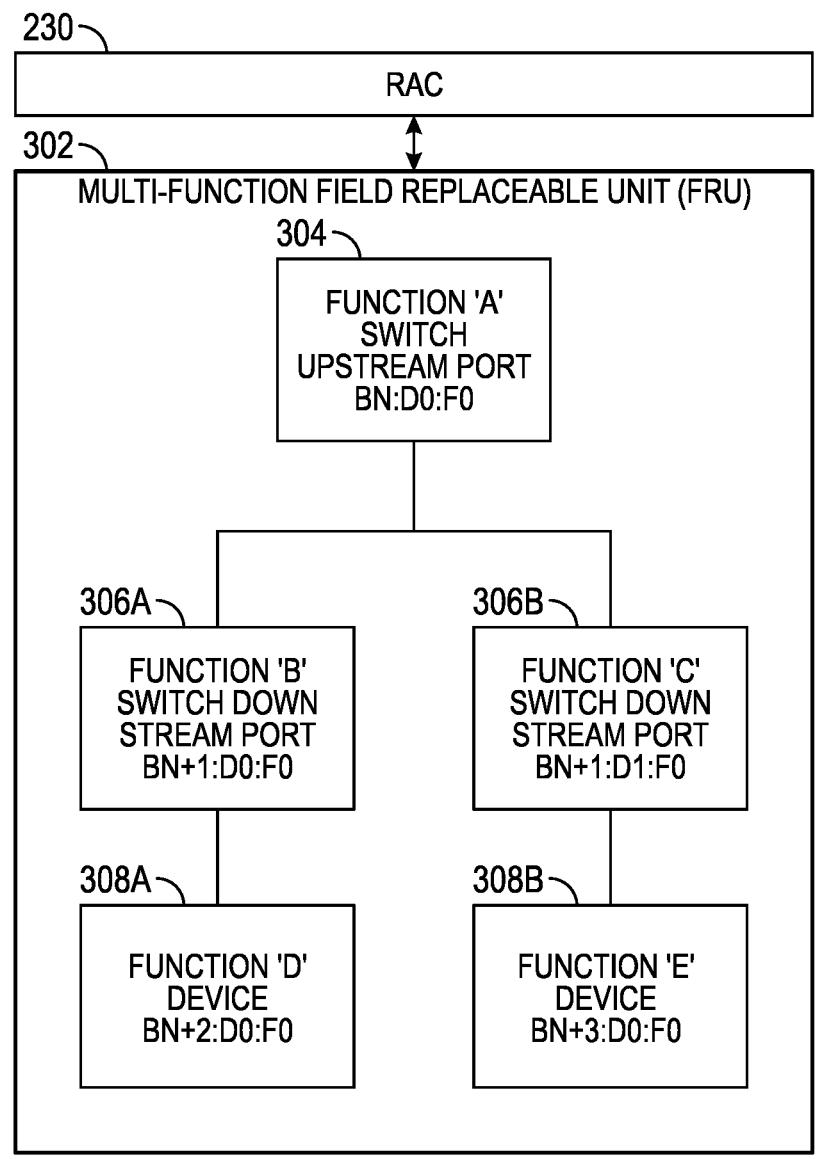
FIG. 3 illustrates a diagram view of an example multi-Function field replaceable unit representation system according to one embodiment of the present disclosure.

FIG. 3 illustrates a diagram view of an example RAC 230 in communication with a multi-Function FRU 302. The multi-Function FRU 302 includes a Function 304, two Functions 306a-b, and two Functions 308a-b arranged as shown. Function "A" may have PCIe/CXL FRU Device/Function path=D0:F0, Function "B" may have PCIe/CXL FRU Device/Function path=D0:F0–D0:F0, Function "C" may have PCIe/CXL FRU Device/Function path=D0:F0–D1:F0, Function "D" may have PCIe/CXL FRU Device/Function path=D0:F0–D0:F0-D0:F0, while Function "E" may have PCIe/CXL FRU Device/Function path=D0:F0–D1:F0–D0:F0.

Such a representation provides a unique path for each of the Functions 304, 306a-b, and 308a-b. Additionally, PCIe bus numbers can change depending on the configuration. But since this model does not include the PCIe bus number, the path is static regardless of the assigned bus number. Some PCIe/CXL FRUs can dynamically reconfigure their layout. For such FRUs, the path for the Function would not be static for the life of the FRU. This is a rare case, but the present disclosure provides an embodiment to solve this issue.

There are two types of multi-Function PCIe/CXL components, namely those composed of a single FRU, and those composed of multiple FRUs. For multi-Function components composed of multiple FRUs, the RAC 230 would need to authenticate each individual FRU by reading the certificate chain from each FRU via SPDM. For multi-Function components composed of a single FRU, the RAC 230 could read the entire certificate chain from each Function. But reading the entire certificate chain can be a time-consuming task, especially via SPDM over SMBus that possesses relatively restrictive bandwidth limitations. The SPDM protocol used by the RAC may require a mechanism to extend the certificate retrieval mechanism to specify the PCIe/CXL Device/Function path from which to retrieve the certificate (e.g., OEM command or a new standard command). Ideally, the RAC 230 would have a way to authenticate the "first" Function on the PCIe/CXL FRU (e.g., the Device 0/Function 0 on the furthest upstream bus), and then have a way to cryptographically verify all other Functions associated with the PCIe/CXL FRU without the need to read the full certificate chain from each Function. The problem is that there is no industry standard way for a PCIe/CXL component to indicate which Devices/Functions are associated with a single FRU and thus there is no way for a RAC 230 to avoid the penalty of reading the entire certificate chain from each Function.

Embodiments of the present disclosure provide a multi-Function FRU representation system 300 that enables techniques for a host (e.g., RAC 230) to distinguish if a multi-Function PCIe/CXL component is composed of a single FRU or composed of multiple FRUs, and in the event it is composed of a single FRU, then this disclosure provides a way to authenticate each Function in the FRU without the burden of reading the full certificate chain from each Function (a heavy operation, especially for SMBus).

Figure 4:
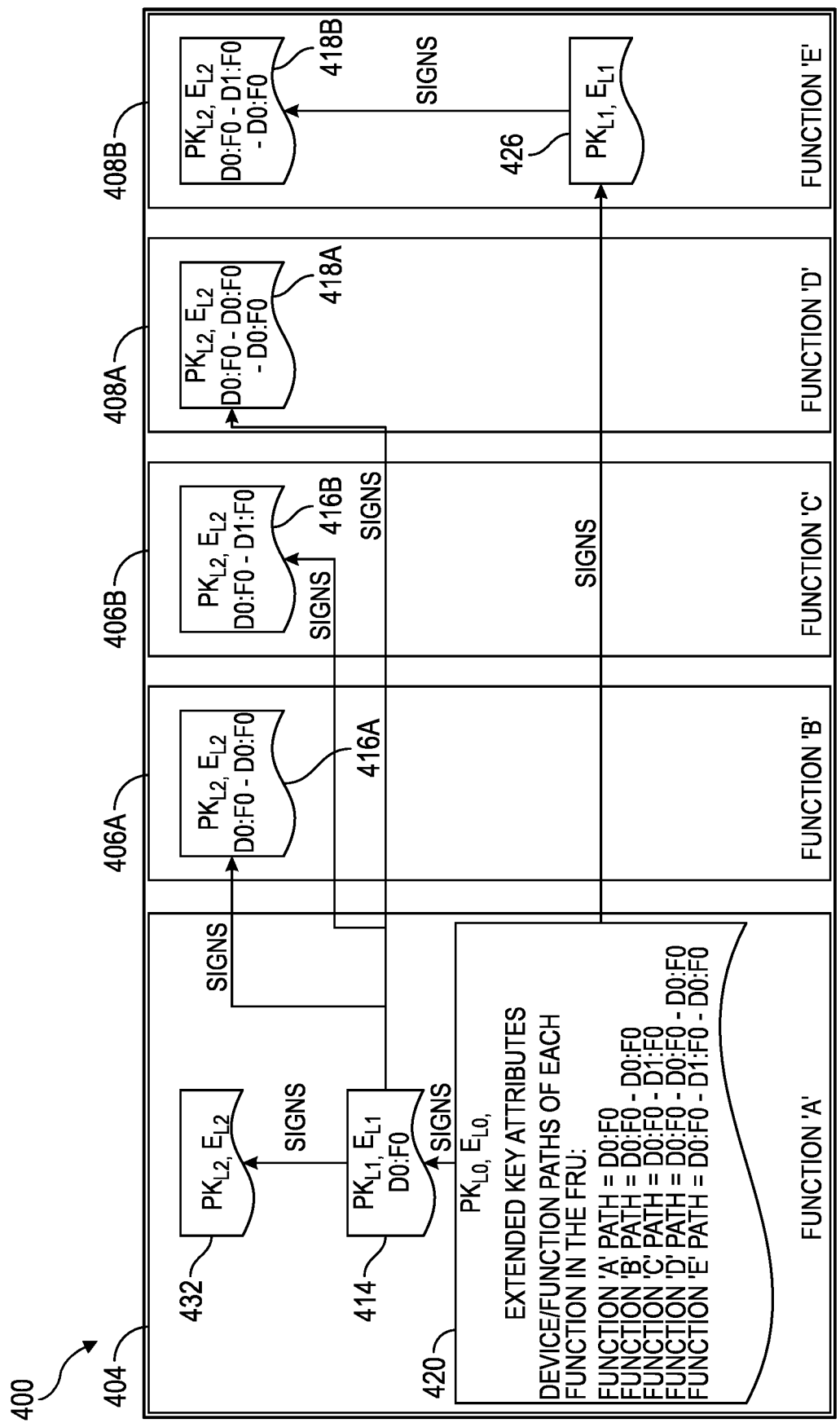
FIG. 4 is a diagram view illustrating an example TCB-based certificate hierarchy that may be used to implement the multi-Function field replaceable unit representation system according to one embodiment of the present disclosure.

FIG. 4 is a diagram view illustrating an example certificate structure 404 that may be used to put the list of Function paths associated with the single physical device/FRU/ASIC in the Extended Key Attributes of the certificate for the "first" Function on the device. Generally speaking, the solution is to define a mechanism where the "first" Function on the PCIe/CXL FRU 302 (i.e., the Device 0/Function 0 on the furthest upstream bus) is authenticated using the normal SPDM methods.

The certificate structure 404 provides a mechanism to allow a RAC 230 to determine all PCIe/CXL Functions associated with a single physical device/FRU/ASIC. In one embodiment, a list of Function paths associated with the single physical device/FRU/ASIC may be put in the Extended Key Attributes of the certificate for the "first" Function on the PCIe/CXL component. The paths in the Extended Key Attributes list the Functions associated with the single physical device/FRU/ASIC regardless of whether the firmware on every Function is the same or not.

Figure 5:
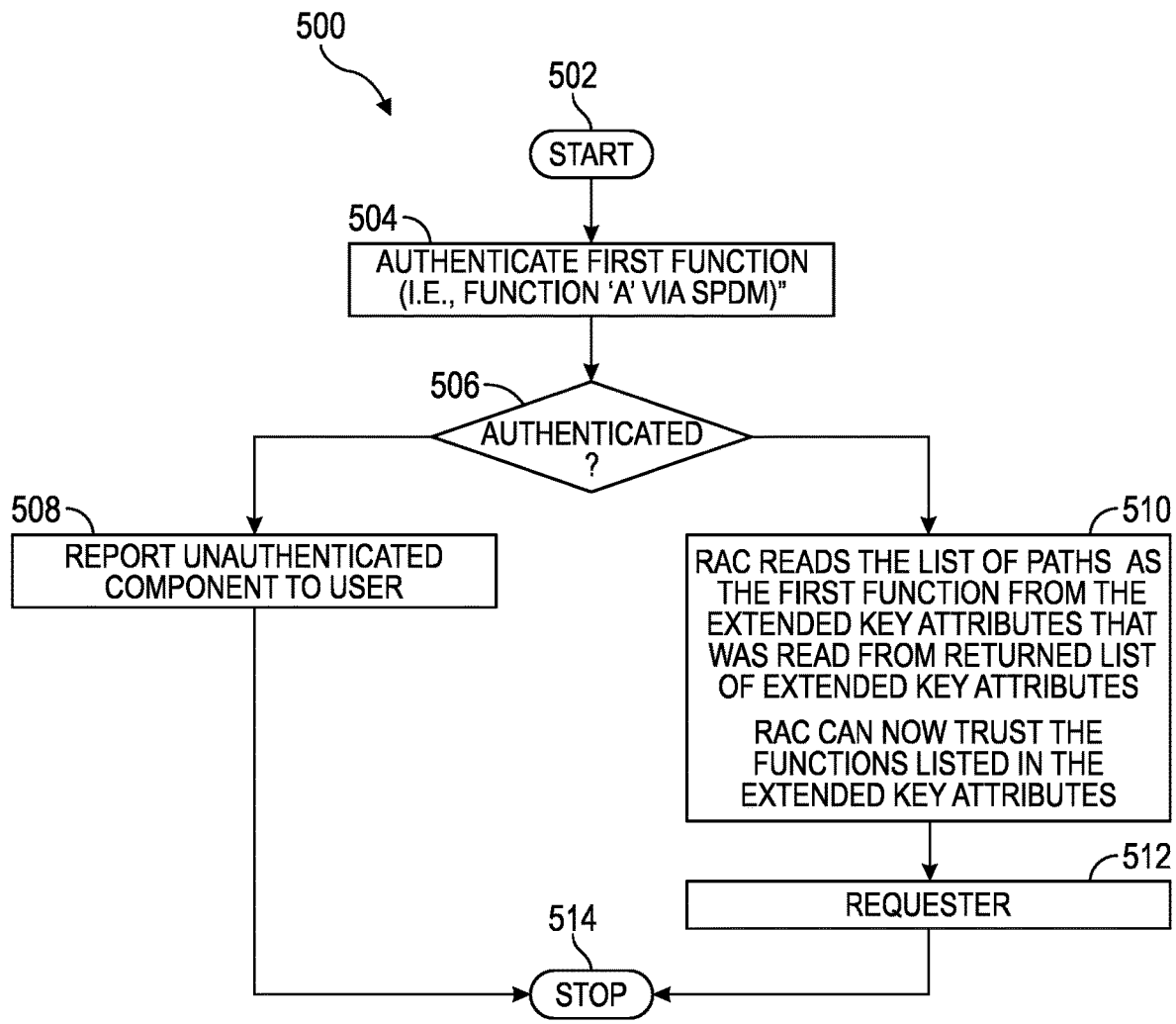
FIG. 5 illustrates an example flow diagram that may be performed by the multi-Function field replaceable unit representation system according to one embodiment of the present disclosure.

FIG. 5 illustrates an example multi-Function component representation method 500 according to one embodiment of the present disclosure. The multi-Function component representation method 500 may be performed at least in part, by the RAC 230. The multi-Function component representation method 500 may be performed at any suitable time. In one embodiment, the multi-Function component representation method 500 may be performed at initial power on of the multi-Function PCIe/CXL FRU.

At step 502 the method begins. At step 504, the method 500 authenticates the "first" Function on the PCIe/CXL FRU (e.g., the Device 0/Function 0 on the furthest upstream bus). Thereafter at step 506, the method 500 determines whether the authentication was successful. If not, processing continues at step 508 in which the unauthenticated FRU is reported to the user (e.g., via the remote management interface 101). In one embodiment, the unauthenticated FRU may be quarantined (e.g., by disabling the PCIe link to the FRU) so that it cannot adversely affect the security context of other FRUs in the IHS 200.

If, however, the authentication was successful, the method 500 may at step 510, the method 500, via the RAC 230, has already read the certificate chain of the first Function in 504, therefore it then looks in the Extended Key Attributes of the TCB layer 0 certificate (420) of the first Function to get the list of Device/Function paths associated with the FRU. The list of Device/Function paths may include information about each Function implemented in the FRU along with a path associated with each Function. In one embodiment, the list of Device/Function paths may be included in a certificate for TCB layer 0 firmware on the "first" Function of the PCIe CXL FRU. That is, the PCIe/CXL multi-Function component may put the list of Function paths associated with the FRU (e.g., single physical device) in the Extended Key Attributes of the certificate for the first Function on the FRU (e.g., the Device 0/Function 0 on the furthest upstream bus) such that, when requested, it may return this information to the SPDM requester. For example, method 500 may be used to authenticate hardware and firmware for PCIe/CXL components with multiple Functions whose Function paths never change and where every Function is running the same firmware.

The requester/verifier then at step 512 performs authentication on any Function it detects that is not included in the list of paths. Thereafter at step 514, the method 500 ends.

Figure 6:
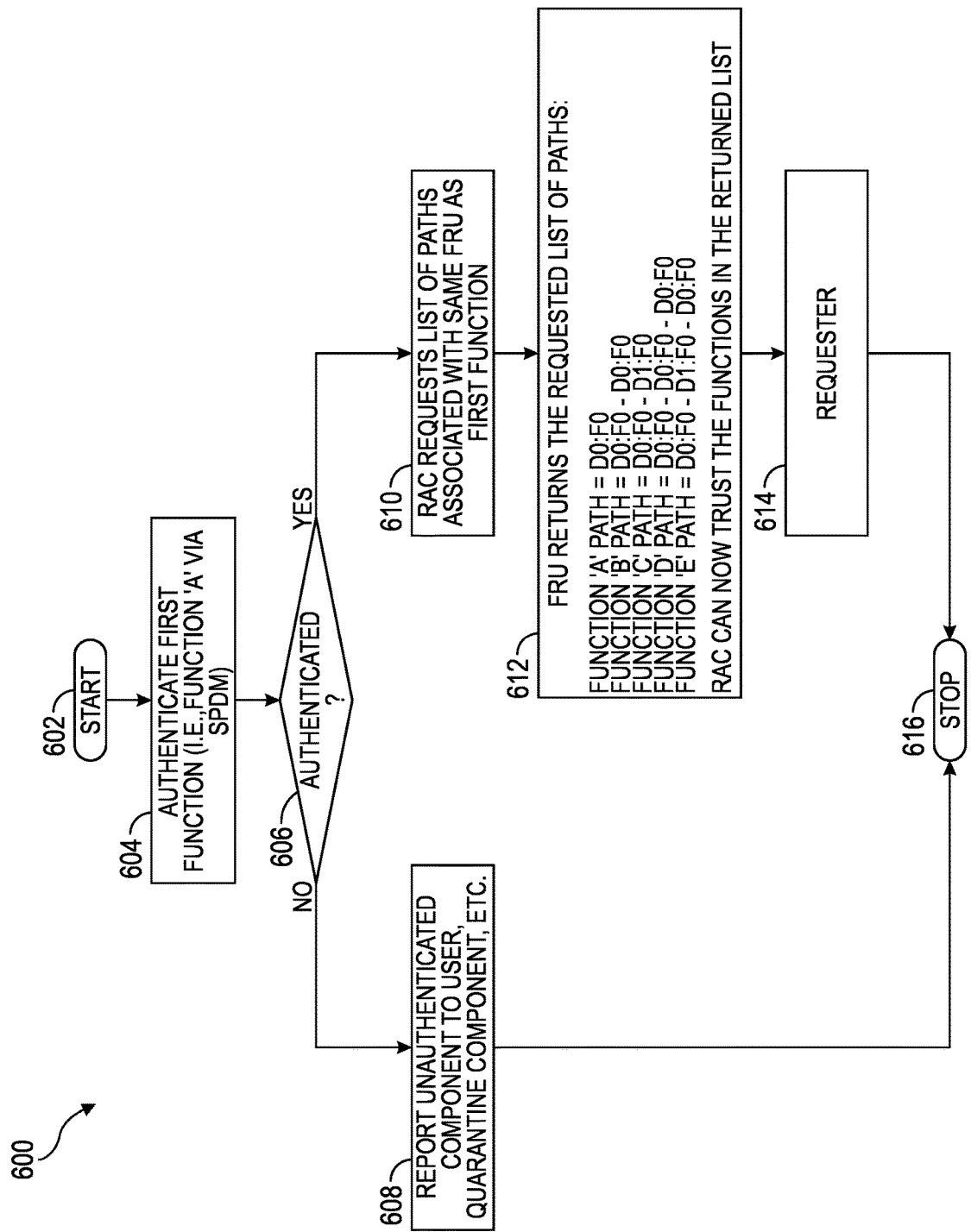
FIG. 6 illustrates an example multi-Function field replaceable unit representation method according to one embodiment of the present disclosure.

FIG. 6 illustrates another example multi-Function component representation method 600 according to one embodiment of the present disclosure. Such an embodiment may be useful for scenarios in which the PCIe/CXL FRU Device/Function path may or may not be static for the life of the FRU.

Note that unlike the embodiment of FIGS. 4 and 5, the embodiment of FIG. 6 is still valid even if the FRU's layout is reconfigured after the time of manufacture. The pathway to the first Function must remain the same per PCIe architecture, and the first Function can return the updated paths if the FRU is reconfigured. For example, after receiving the request, firmware running on the FRU may identify all Functions configured in the FRU. When firmware running on the FRU is initialized, it compiles a list of Device/Function paths for each Function on the FRU. The firmware will have inherent knowledge of the configuration of the FRU. So if the configuration changes, the firmware will know about it and generate an updated list of Device/Function paths. In this way, the configuration can change whereas in in the above embodiment described above with reference to 420, the configuration had to be static. Thus as shown, the method 600 may be able to provide accurate Function information even when the FRU has been re-configured following manufacture.

At step 602 the method begins. At step 604, the method 600 authenticates the first Function of the FRU in which the first Function is the Device 0/Function 0 on the furthest upstream bus. Thereafter at step 606, the method 600 determines whether the authentication was successful. If not, processing continues at step 608 in which the unauthenticated FRU is reported to the user (e.g., via the remote management interface 101). In one embodiment, the unauthenticated FRU may be quarantined (e.g., by disabling the PCIe link to the FRU) so that it cannot adversely affect the security context of other FRUs in the IHS 200.

If, however, the authentication was successful, the method 600 may at step 610, cause the requester/verifier (e.g., RAC 230) to request, from the "first" Function, the list of PCIe/CXL FRU Device/Function paths of each Function of the FRU. In one embodiment, requesting the list of PCIe/CXL FRU Device/Function paths may be provided by a newly defined SPDM request issued from the requester/verifier to the FRU.

The FRU responds by providing the list of PCIe/CXL Device/Function paths to the requester/verifier at step 612. In one embodiment, the FRU responds by obtaining the list of PCIe/CXL Device/Function paths from its memory, which may be any portion of the memory of the FRU that is not writable by any unauthorized entity. The requester/verifier then at step 614 performs authentication on any Function it detects that is not included in the list of paths. Thereafter at step 616, the method 600 ends.

While FIGS. 5 and 6 illustrate several example multi-Function component representation methods 500, 600 showing how Function paths may be represented in a multi-Function component, the features of the disclosed processes may be embodied in other specific forms without deviating from the spirit and scope of the present disclosure. For example, certain steps of the disclosed methods 500, 600 may be performed sequentially, or alternatively, they may be performed concurrently. As another example, the methods 500, 600 may perform additional, fewer, or different operations than those operations as described in the present example.

Figure 7:
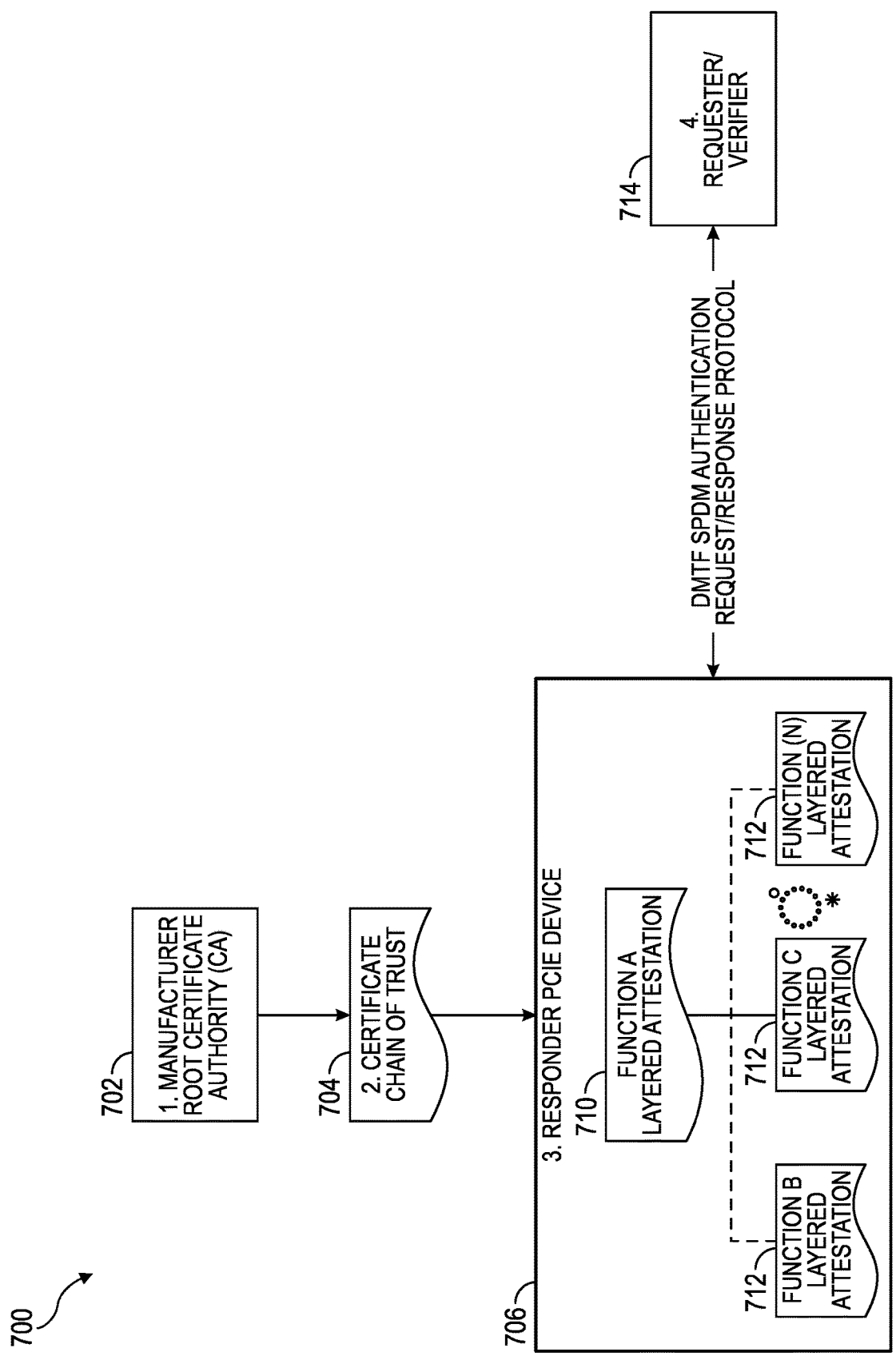
FIG. 7 illustrates another example diagram showing how a manufacturer may install a certificate chain on a multi-Function field replaceable unit during a manufacturing process according to one embodiment of the present disclosure.

FIG. 7 illustrates an example certificate model 700 that may be implemented according to the multi-Function FRU representation system 300 according to one embodiment of the present disclosure. The certificate model 700 includes a manufacturer root certificate authority (CA) 702 (e.g., device manufacturer) that creates a certificate chain of trust 704 for a Function A 710. That is, during manufacturing, the device maker will install the certificate chain for the first Function onto the FRU itself. The requester/verifier (e.g., the RAC 230) reads the certificate chain from the FRU via SPDM. As shown, the requester/verifier 714 reads the certificate chain from Function A 710. The DICE TCB layer 0 cert for Function A 710 may contain Extended Key Attributes that list the path of every Function in the FRU; or it may not and instead the requester/verifier 714 would need to make a call to Function A 710 to get the paths of all Functions in the FRU. The RAC 230, nevertheless, needs to read the certificate chains from all the other Functions by looking at the Device/Function paths of each Function in the FRU that it read and then make a new SPDM call to retrieve the certificate chain for every Function in that list. SPDM needs to be extended to include two additional pieces of information in the response for a specific Function, namely the Device/Function path of the certificate chain that the currently requested Function's certificate chain is linked to, and the certificate number (e.g., 1 is first certificate in the chain, 2 is second certificate in the chain, etc.) within the certificate chain that the requested Function's certificate chain is linked to. If the firmware for the Function whose certificate chain is currently requested is the same as the firmware for the first Function, then the Function can return an indication that its firmware is the same as the first Function's firmware and therefore does not have its own certificate chain. Given the example in FIG. 4, if a certificate chain for "Function B" is requested, a certificate chain (406A) is returned with information that it is linked to the second certificate in the chain from "Function A" (e.g., D0:F0). To provide another example, if a certificate chain for "Function E" is requested, a certificate chain (408B) is returned with information that it is linked to the first certificate in the chain from "Function A" (e.g., D0:F0). The RAC 230 would then authenticate the certificate chain for every Function. If any Function failed authentication, the RAC 230 could report it to the user, attempt to quarantine that one Function, or quarantine the whole FRU that the function is a part of.

The certificate model 700 as shown provides a hierarchy of evidence (e.g., certificates) that can tie the evidence for each Function eventually with the first Function and layer 0. In one embodiment, authentication provisioning may be a process implemented by the PCIe/CXL FRU vendor as part of its manufacturing flow.

Referring again to FIG. 4, a diagram view is shown illustrating an example certificate topology 400 that may be used to implement the multi-Function component representation system that generates a hierarchy of evidence (Certificates) that can tie the evidence for each Function eventually with the first Function and layer 0. The certificate topology 400 generally includes a certificate structure 404 associated with Function A, a certificate structure 406a associated with Function B, a certificate structure 406b associated with Function C, a certificate structure 408a associated with Function D, and a certificate structure 408b associated with Function E. These certificates conform to the TCG DICE model where device ID certificates are specific to the hardware whereas alias certificates cover the firmware as well. Layer 0 certificate 420 is a device ID certificate per TCG DICE. Layer 0 firmware is considered immutable since it represents hardware identity. Layer 1 and Layer 2 certificates are alias certificates per TCG DICE since the layer 1 and 2 firmware are mutable in this example.

For the example certificate hierarchy shown, TCB layer 0 firmware is common for all 5 Functions. Therefore, a single layer 0 certificate 420 may be implemented to cover all of them. The certificate 414 is for the layer 1 firmware on Function A, B, C, and D because they all have the same layer 1 firmware in this example. Function E has different layer 1 firmware from the other Functions and so it has its own layer 1 certificate 426 in Function E. Certificates 414 and 426 are TCG DICE alias certificates for layer 1 firmware. Certificate 432, 416A, 416B, 418A, and 418B are alias certificates for layer 2 firmware.

For layer 2, each Function has an alias certificate for its respective layer 2 implementation. This may mean that each Layer 2 implementation is specific, or at least, may have specific configuration information that makes its identifier unique and, hence warranting separate certificates. This applies to the two layer 1 certificates as well (e.g., it applies to all the alias certificates).

When the multi-Function component 300 is turned on (e.g., booted) for the first time, firmware running on the FRU uses PKL0 from certificate 420 to sign the layer 1 cert (PKL1, EL1) for Function A 414 and Function E 426. Firmware running on the FRU uses PKL1 from certificate 414 to sign to sign the certificates 416A, 416B, 418A, and 432, and PKL1 from certificate 426 in Function E to sign the certificate 418B in Function E. A first assumption is that all the Functions support an alias certificate model. Another assumption is that the evidence is provided by certificates as well as measurements or any other form of evidence. Yet another assumption is that the mechanism applies to multiple virtual as well as multiple physical Functions provided by the FRU.

In one embodiment, the hierarchy of evidence may be provided for the hardware of each Function, the hardware and firmware installed on each Function, or only the firmware installed on each Function. For example, method 500 may be used to authenticate hardware and firmware for PCIe/CXL components with multiple Functions whose Function paths never change and where every Function is running the same firmware, while method 600 may be used to authenticate hardware and firmware for PCIe/CXL components with multiple Functions whose Function paths may change and where every Function is running the same firmware.

Method 500, using the certificate hierarchy 400 of FIG. 4, can be used to authenticate hardware and firmware for PCIe/CXL components with multiple Functions whose Device/Function paths never change and where every Function is not running the same firmware. The RAC 230, nevertheless, needs to read the certificate chains from all the other Functions by looking at the Device/Function paths of each Function in the FRU that it read and then make a new SPDM call to retrieve the certificate chain for every Function in that list. SPDM needs to be extended to include two additional pieces of information in the response for a specific Function, namely the Device/Function path of the certificate chain that the currently requested Function's certificate chain is linked to, and the certificate number (e.g., 1 is first certificate in the chain, 2 is second certificate in the chain, etc.) within the certificate that the requested Function's certificate chain is linked to. If the firmware for the Function whose certificate chain is currently requested is the same as the firmware for the first Function, then the Function can return an indication that its firmware is the same as the first Function's firmware and therefore does not have its own certificate chain. Given the example in FIG. 4, if a certificate chain for "Function B" is requested, a certificate chain (406A) is returned with information that it is linked to the second certificate in the chain from "Function A" (e.g., D0:F0). To provide another example, if a certificate chain for "Function E" is requested, a certificate chain (408B) is returned with information that it is linked to the first certificate in the chain from "Function A" (e.g., D0:F0). The RAC 230 would then authenticate the certificate chain for every Function.

Method 600, using the certificate hierarchy 400 of FIG. 4, can be used to authenticate hardware and firmware for PCIe/CXL components with multiple Functions whose Function paths may change and where every Function is not running the same firmware. Like the previous case, the RAC 230 needs to read the certificate chains from all the other Functions by looking at the Device/Function paths of each Function in the FRU that it read and then make a new SPDM call to retrieve the certificate chain for every Function in that list. SPDM needs to be extended to include two additional pieces of information in the response for a specific Function, namely the Device/Function path of the certificate chain that the currently requested Function's certificate chain is linked to, and the certificate number (e.g., 1 is first certificate in the chain, 2 is second certificate in the chain, etc.) within the certificate that the requested Function's certificate chain is linked to. If the firmware for the Function whose certificate chain is currently requested is the same as the firmware for the first Function, then the Function can return an indication that its firmware is the same as the first Function's firmware and therefore does not have its own certificate chain. Given the example in FIG. 4, if a certificate chain for "Function B" is requested, a certificate chain (406A) is returned with information that it is linked to the second certificate in the chain from "Function A" (e.g., D0:F0). To provide another example, if a certificate chain for "Function E" is requested, a certificate chain (408B) is returned with information that it is linked to the first certificate in the chain from "Function A" (e.g., D0:F0). The RAC 230 would then authenticate the certificate chain for every Function. It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A function representation system comprising:
a multi-Function Peripheral Component Interconnect/Compute Express Link (PCIe/CXL) Field Replaceable Unit (FRU) comprising a plurality of Functions that each are represented by a unique Device/Function path, the plurality of Functions comprising at least one processor and at least one memory coupled to the at least one processor, the at least one memory having program instructions stored thereon that, upon execution by the at least one processor, cause the PCIe/CXL FRU to:
receive a request from a Security Protocol and Data Model (SPDM) requester to obtain information about a plurality of Functions associated with the PCIe/CXL FRU; and
respond to the request by sending a list of Device/Function paths to the SPDM requester, wherein each Device/Function path indicates the Function and the path to the Function associated with the PCIe/CXL FRU.

2. The function representation system of claim 1, wherein the request comprises an authentication request from the SPDM requester.

3. The function representation system of claim 1, wherein the instructions, upon execution, cause the first Function to:
respond to the request by sending a certificate chain of the first Function to the SPDM requester, wherein the list of Device/Function paths is included in an Extended Key Attribute field of a TCB layer 0 certificate.

4. The function representation system of claim 3, wherein the list of Device/Function paths comprises a hierarchy of evidence that ties the evidence for each Function eventually with the first Function.

5. The function representation system of claim 1, wherein the instructions, upon execution, cause the PCIe/CXL FRU to:
Receive the request after the first PCIe Function has been authenticated by the SPDM requester, wherein the request comprises a single Security Protocol and Data Model (SPDM)-based command.

6. The function representation system of claim 5, wherein the instructions, upon execution, cause the PCIe/CXL FRU to obtain the list of Device/Function paths associated with the PCIe/CXL FRU from a memory of the PCIe/CXL FRU.

7. The function representation system of claim 5, wherein the instructions, upon execution, cause the PCIe/CXL FRU to:
determine that the Device/Function path of a second Function has changed; and
generate an updated list of Device/Function paths based on the determination.

8. The function representation system of claim 1, wherein the SPDM requester comprises a Remote Access Controller (RAC).

9. The function representation system of claim 1, wherein the firmware of each of the Functions are implemented in different layers that are structured according to a Device Identifier Composition Engine (DICE) architecture.

10. The function representation system of claim 1, wherein the request comprises a Device/Function path of the Function whose certificate chain is requested, and wherein the instructions, upon execution, cause the PCIe/CXL FRU to:
respond to the request by providing the requested certificate chain along with a Device/Function path of a certificate chain that the requested Function's certificate chain is linked to, and the certificate number within the certificate chain that the requested Function's certificate chain is linked to.

11. A function representation method comprising:
receiving, by a function of a multi-Function Peripheral Component Interconnect/Compute Express Link (PCIe/CXL) Field Replaceable Unit (FRU), a request from a Security Protocol and Data Model (SPDM) requester of the multi-Function PCIe/CXL FRU to obtain information about a plurality of Functions that each are represented by a unique Device/Function path; and
responding to the request by sending a list of Device/Function paths to the SPDM requester, wherein each Device/Function path indicates the Function and the path to the Function associated with the PCIe/CXL FRU.

12. The function representation method of claim 11, further comprising:
responding to the request by sending a certificate chain of the first Function to the SPDM requester, wherein the list of Device/Function paths is included in an Extended Key Attribute field of a TCB layer 0 certificate.

13. The function representation method of claim 11, further comprising:
receiving the request after the first PCIe Function has been authenticated by the SPDM requester, wherein the request comprises a single Security Protocol and Data Model (SPDM)-based command.

14. The function representation method of claim 13, further comprising obtaining the list of Device/Function paths associated with the PCIe/CXL FRU from a memory of the PCIe/CXL FRU.

15. The function representation method of claim 13, further comprising:
determining that the Device/Function path of a second Function has changed; and
generating an updated list of Device/Function paths based on the determination.

16. The function representation method of claim 11, further comprising implementing the firmware of each of the Functions in different layers that are structured according to a Device Identifier Composition Engine (DICE) architecture.

17. The function representation method of claim 11, further comprising:
responding to the request by providing the requested certificate chain along with a Device/Function path of a certificate chain that the requested Function's certificate chain is linked to, and the certificate number within the certificate chain that the requested Function's certificate chain is linked to.

18. An Information Handling System (IHS) comprising:
a multi-Function Peripheral Component Interconnect/Compute Express Link (PCIe/CXL) Field Replaceable Unit (FRU) comprising:
a plurality of Functions that each are represented by a unique Device/Function path, the plurality of Functions comprising at least one processor and at least one memory coupled to the at least one processor, the at least one memory having program instructions stored thereon that, upon execution by the at least one processor, cause the PCIe/CXL FRU to:
receive a request from a Security Protocol and Data Model (SPDM) requester to obtain information about a plurality of Functions associated with the PCIe/CXL FRU; and
respond to the request by sending a list of Device/Function paths associated with the PCIe/CXL FRU to the SPDM requester, wherein each Device/Function path indicates the Function and the path to the Function associated with the PCIe/CXL FRU.

19. The IHS of claim 18, wherein the program instructions, upon execution, further cause the PCIe/CXL FRU to:
respond to the request by sending a certificate chain of the first Function to the SPDM requester, wherein the list of Device/Function paths is included in an Extended Key Attribute field of a TCB layer 0 certificate.

20. The IHS of claim 18, wherein the program instructions, upon execution, further cause the PCIe/CXL FRU to:
receive the request after the first PCIe Function has been authenticated by the SPDM requester, wherein the request comprises a single Security Protocol and Data Model (SPDM)-based command.

* * * * *